(12) United States Patent
Kawasaki et al.

(10) Patent No.: US 9,953,499 B2
(45) Date of Patent: *Apr. 24, 2018

(54) ALARM NOTIFYING SYSTEM

(71) Applicant: PANASONIC INTELLECTUAL PROPERTY MANAGEMENT CO., LTD, Osaka (JP)

(72) Inventors: Yuji Kawasaki, Fukuoka (JP); Ryosuke Kitago, Fukuoka (JP); Hirotaka Fukutsuka, Fukuoka (JP); Keiji Yamahai, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,945

(22) Filed: Apr. 5, 2017

(65) Prior Publication Data

US 2017/0206760 A1    Jul. 20, 2017

Related U.S. Application Data (63) Continuation of application No. 14/800,382, filed on Jul. 15, 2015, now Pat. No. 9,652,961, which is a (Continued)

(30) Foreign Application Priority Data

Apr. 23, 2009    (JP) ................................. 2009-105463

(51) Int. Cl.
  *G08B 13/196*    (2006.01)
  *H04N 7/18*    (2006.01)
(Continued)

(52) U.S. Cl.
  CPC ..... *G08B 13/196* (2013.01); *G08B 13/19656* (2013.01); *H04N 7/08* (2013.01); *H04N 7/183* (2013.01); *H04R 1/04* (2013.01)

(58) Field of Classification Search
  CPC ......... H04H 20/61; H04H 20/69; G08B 21/02
  See application file for complete search history.

(56) References Cited

U.S. PATENT DOCUMENTS 5,572,201 A    11/1996    Graham
5,589,818 A    12/1996    Queen
(Continued)

FOREIGN PATENT DOCUMENTS

JP    9-200381    7/1997
JP    2002-78037    3/2002
(Continued)

OTHER PUBLICATIONS

International Search Report dated May 11, 2010.
Japanese Office Action dated Feb. 5, 2013.

*Primary Examiner* — Nabil Syed
(74) *Attorney, Agent, or Firm* — Dickinson Wright PLLC (57) ABSTRACT

A sound amplification apparatus includes one or more microphones that convert collected sound into an audio signal and transmit the audio signal by radio and a sound receiving apparatus that receives the audio signal transmitted from the microphone and amplifies and outputs the sound based on the audio signal. The sound receiving apparatus is configured to perform sound output control in an emergency mode upon receiving an emergency signal transmitted in response to operation of an emergency switch of the microphone. With this configuration, it is possible to perform appropriate sound control in a dangerous situation such as intrusion of a suspicious person.

19 Claims, 8 Drawing Sheets

Related U.S. Application Data continuation of application No. 13/265,298, filed as application No. PCT/JP2010/002611 on Apr. 9, 2010, now Pat. No. 9,508,240.

(51) Int. Cl.
*H04N 7/08* (2006.01)
*H04R 1/04* (2006.01)

(56) References Cited

U.S. PATENT DOCUMENTS

| | | |
|---|---|---|
| 2009/0245268 A1 | 10/2009 | Pugliese |
| 2010/0128123 A1 | 5/2010 | DiPoala |

FOREIGN PATENT DOCUMENTS

| | | |
|---|---|---|
| JP | 2002-260131 | 9/2002 |
| JP | 2003-187363 | 7/2003 |
| JP | 2004-336227 | 11/2004 |
| JP | 2005-182381 | 7/2005 |
| JP | 2006-338647 | 12/2006 |
| JP | 2007-26342 | 2/2007 |
| JP | 2009-21752 | 1/2009 |

ALARM NOTIFYING SYSTEM

RELATED APPLICATION

This application is a continuation application of application Ser. No. 14/800,382 filed Jul. 15, 2015, which is a continuation application of application Ser. No. 13/265,298, filed Oct. 19, 2011, which claims the benefit of Japanese Patent Application No. 2009-105463 filed Apr. 23, 2009, and which is a national phase of PCT/JP2010/002611 filed Apr. 9, 2010, the entire contents of each of which are incorporated herein by reference.

TECHNICAL FIELD

The present invention relates to a sound receiving apparatus that receives a sound signal from a microphone and, in particular, relates to a sound receiving apparatus used inside a building such as a classroom of a school, a church, a meeting room, or a hall.

BACKGROUND ART

In recent years, there were several incidents in which a suspicious person intruded into, for example, a classroom while students were in class and killed the students and teachers. Various measures are taken against such a crime. Conventionally, there is known an alarm apparatus that outputs an alarm for informing a security center or the like of, for example, intrusion of a suspicious person.

Patent Literature 1 discloses an alarm apparatus that can identify a location where an incident occurs and take quick and appropriate measures. In the alarm apparatus described in Patent Literature 1, alarm switches are provided in classrooms and, when the alarm switch is operated, an emergency signal is transmitted to a broadcasting room. In the broadcasting room, a classroom is identified on the basis of the emergency signal. An alarm lamp corresponding to the identified classroom is turned on. Accordingly, it is possible to quickly locate a classroom in which an incident occurs.

CITATION LIST

Patent Literature

Patent Literature 1: Japanese Patent Application Laid-Open Publication Mo. 2003-187363

SUMMARY OF INVENTION

Technical Problem

In the alarm apparatus described in Patent Literature 1, the alarm switch is provided in a predetermined location of the classroom. When neither a student nor a teacher is present near the alarm switch, it is difficult to press the alarm switch without being noticed by an intruder. If the act of moving to the location where the alarm switch is installed and pressing the alarm switch is exposed to the eyes of the intruder, the teacher and students may be exposed to increased danger.

In particular, inside a building, when an educational material is played in the classroom using a sound amplification apparatus or other audio equipment, because of sound emitted by the sound amplification apparatus or the audio equipment, it is difficult to distinguish, from the outside of the classroom, an abnormal state from an ordinary state of the class. There is a risk that damage increases because of a delay in taking measures. There is also a risk that the intruder is driven to distraction because of amplified sound offensive to the ears of the intruder. It is also likely that disorder is caused because it is difficult for victims to communicate with one another.

In view of the background, it is an object of the present invention to provide a sound receiving apparatus that, in a dangerous situation such as intrusion of a suspicious person, can perform appropriate sound control and notify the dangerous situation.

Solution to Problem

A sound receiving apparatus according to the present invention is a sound receiving apparatus that receives an audio signal transmitted from one or more microphones, which convert collected sound into an audio signal and transmit the audio signal by radio, and amplifies and outputs sound based on the audio signal, the sound receiving apparatus performing sound output control in an emergency mode when receiving an emergency signal transmitted in response to operation of an emergency switch of the microphone. The sound receiving apparatus comprises a detecting section that detects a sound signal including a tone signal encoded as the emergency signal and an emergency signal detecting section that extracts the tone signal from the sound signal detected by the detecting section and detects the emergency signal from the extracted tone signal.

Advantageous Effect of Invention

According to the present invention, since the sound receiving apparatus receives an emergency signal transmitted according to the operation of the emergency switch included in the microphone, which somebody often has at hand, there is an excellent effect that it is possible to switch the sound receiving apparatus to the sound output control in the emergency mode without being noticed by an intruder.

As explained below, other forms are present in the present invention. Therefore, the disclosure of the present invention intends to provide a part of the present invention and does not intend to limit a scope of the invention described and claimed herein.

DESCRIPTION OF EMBODIMENTS

Sound receiving systems and sound receiving apparatuses according to embodiments of the present invention are explained below with reference to the drawings. The embodiments explained below are mere examples of the present invention. The present invention can be modified to various forms. Therefore, specific configurations and functions disclosed below do not limit the scope of claims. In the following explanation, a sound receiving apparatus used in a classroom of a school is explained. However, the sound receiving apparatus can be used not only in the classroom of the school but also in a church, a meeting room, a hall, and the like.

(First Embodiment)

Figure 1:
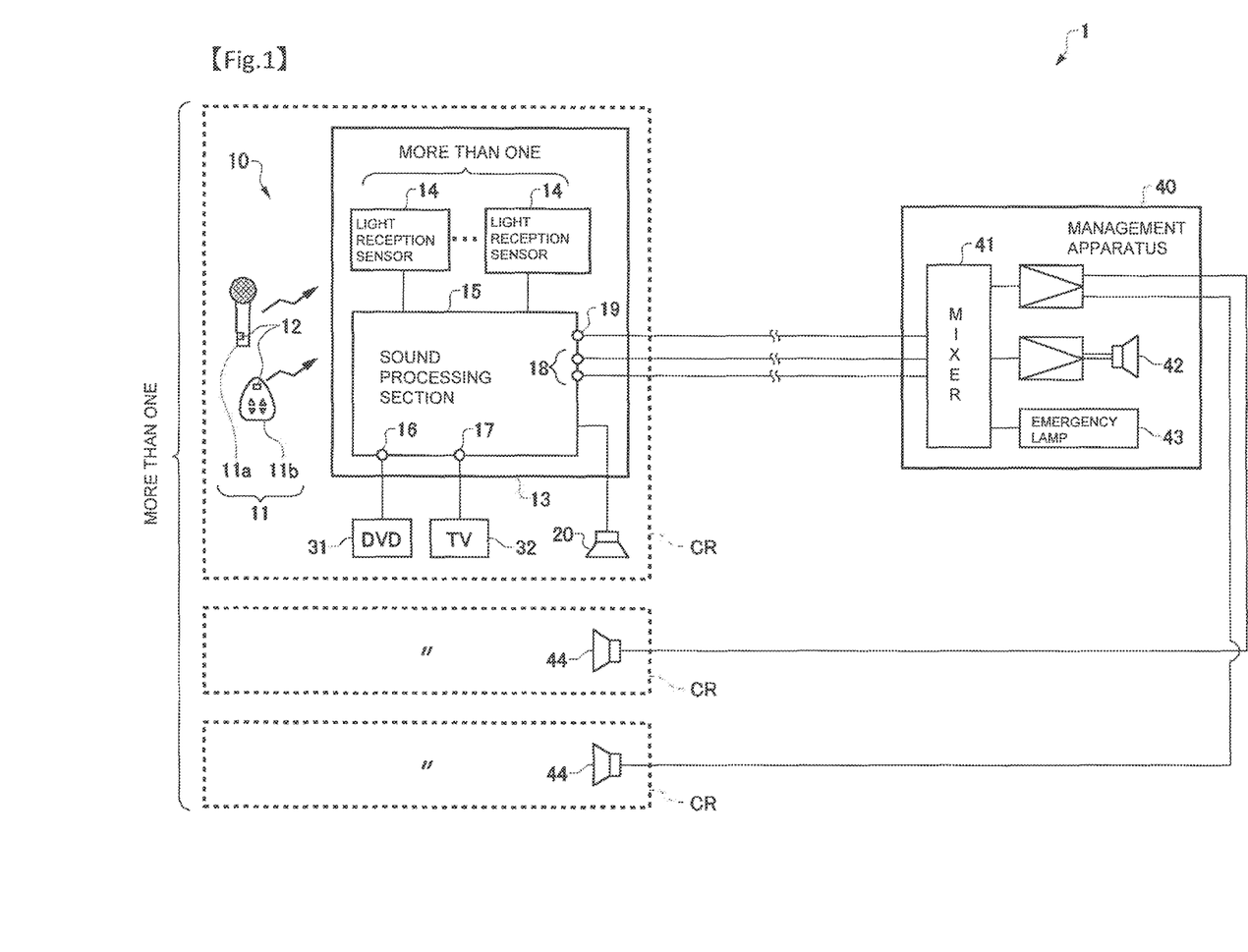
FIG. 1 is a diagram showing the configuration of a sound receiving system according to a first embodiment.

FIG. 1 is a diagram showing the configuration of a sound receiving system 1 according to a first embodiment. The sound receiving system 1 according to the first embodiment comprises a sound amplification apparatus 10 used in each of plural classrooms CR (Classroom; and a management apparatus 40 connected to plural sound amplification apparatuses 10.

The sound amplification apparatus 10 comprises a sound receiving apparatus 13 that receives audio signals transmitted from plural microphones 11a and 11b by radio and amplifies and outputs sound based on the received audio signals. In the following explanation, the plural microphones 11a and 11b are generally referred to as "microphone 11".

An emergency switch 12 is provided in the microphone 11. When the emergency switch 12 is operated, the microphone 11 transmits an emergency signal by radio while including the emergency signal in a tone signal. The emergency signal is a signal for requesting the sound receiving apparatus 13 to perform sound output control in an emergency mode. The emergency mode is a mode for relatively increasing the volume of collected sound of the microphone 11 with respect to the volume of an audio signal, which hinders emergency notification, and outputting sound having high audibility of the collected sound. Specific sound output control in the emergency mode is explained later.

The emergency switch 12 may be a dedicated switch or may be commonly used with switches having other functions provided in the microphone 11 in advance such as a function switch. When the function switch is used, the microphone 11 may be configured to transmit an emergency signal, for example, when the function switch is pressed long for a predetermined time (e.g., two seconds) or more.

As the microphone 11, a normal hand-held microphone 11a, a microphone 11b of a type that can be used freehand while being hung from the neck, or the like can be used. In this embodiment, two microphones 11 are shown. However, it goes without saying that the number of microphones 11 is not limited to two.

Figure 2:
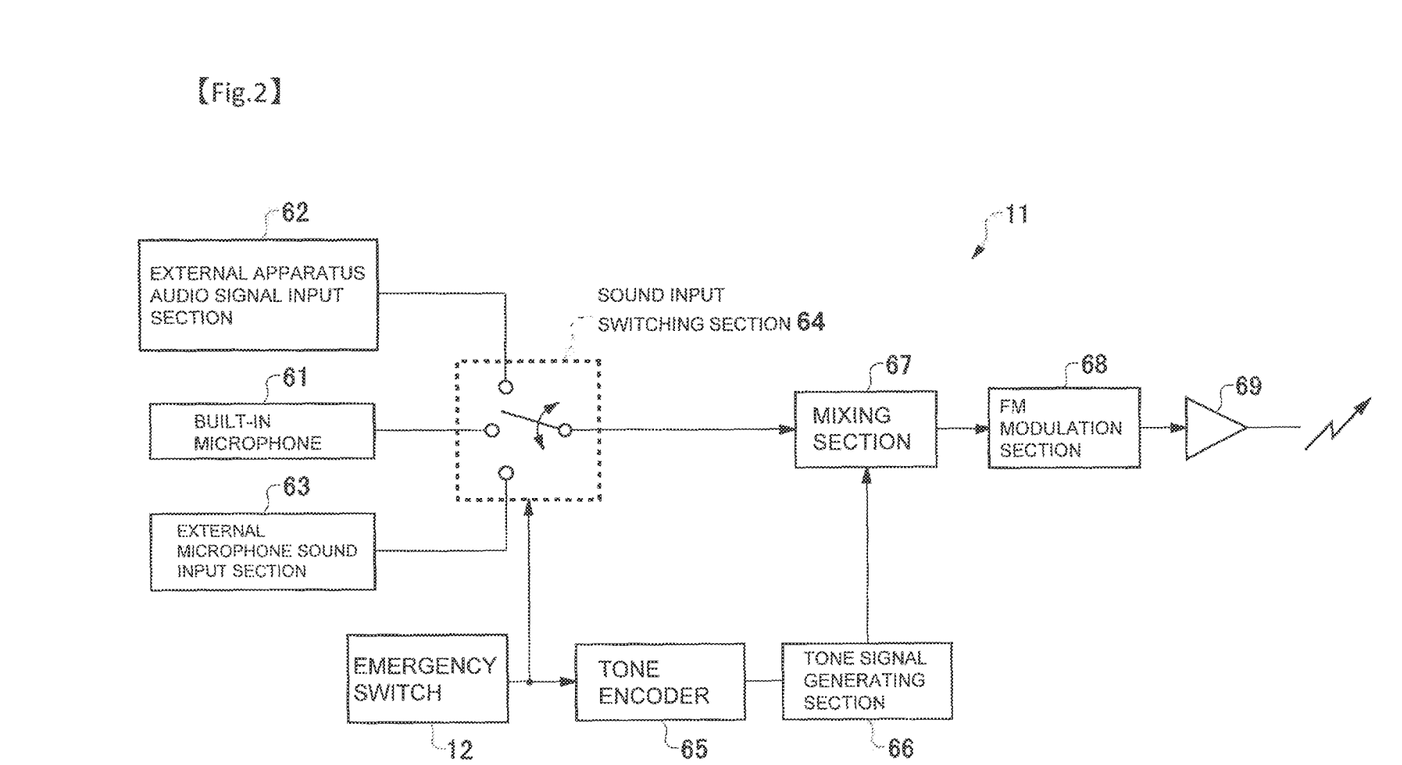
FIG. 2 is a diagram showing the configuration of a microphone.

FIG. 2 is a diagram showing the configuration of the microphone 11. The microphone 11 comprises a built-in microphone 61 that collects sound and converts the sound into an audio signal, an external apparatus audio signal input section 62 to which an audio signal of an external apparatus is input, an external microphone sound input section 63 to which sound of an external microphone is input, and a sound input switching section 64 that switches an audio signal output from collected or input audio signals. The microphone 11 comprises a tone encoder 65 that encodes a tone signal on the basis of inputs from the emergency switch 12, other switches which are not shown, and the like, a tone signal generating section 66 that generates a tone signal, a mixing section 67 that mixes the tone signal and the audio signal output from the sound input switching section 64, an FM modulation section 68 that FM-modulates the mixed audio signal, and an amplifier 63.

The signal indicating that the emergency switch 12 is operated is input to the sound input switching section 64 as well. The sound input switching section 64 performs switching of sound according to the signal from the emergency switch 12. For example, while sound of the microphone 11 is muted, a signal input from the emergency switch 12 forces the sound input switching section 64 to release the mute. For example, while an external apparatus audio signal is being input, a signal input from the emergency switch 12 forces the sound input switching section 64 to switch the external apparatus audio signal to a built-in microphone or external microphone sound input. By performing such switching, it is possible to collect sound from the microphone 11 in an emergency. It is possible to communicate a state in the classroom to the outside by sound.

Infrared communication is used to transmit an audio signal from the microphone 11 to the sound receiving apparatus 13. An infrared ray is blocked by the wall of the classroom CR and does not leak to the outside. Therefore, when the infrared communication is used, advantages are that the communication may not interfere with the sound amplification apparatus 10 in the adjacent classroom CR; the same microphone 11 can be used in the adjacent classroom CR; and leakage of sound information is very small. In this embodiment, an example in which the infrared communication is used is explained. However, short distance radio such as Bluetooth (registered trademark) may be used.

The sound receiving apparatus 13 comprises plural light reception sensors 14 that receive infrared signals transmitted from the plural microphones 11, a sound processing section 15 that processes an audio signal, and a speaker 20 that outputs sound. The light reception sensors 14 are capable of communication with the plural microphones 11 having different channels. On the ceiling or the like, there are installed a number of light reception sensors 14 necessary to cover the entire classroom according to a range of infrared rays of the microphones 11. The sound processing section 15 comprises a DVD input terminal 16 and a TV input terminal 17 that receive audio signals from a DVD (DVD video audio reproducing apparatus) 31 and a TV (television) 32. The sound processing section 15 comprises a relay output terminal 18 that outputs an emergency signal and a line output terminal 19 that outputs an audio signal. The relay terminal 18 switches ON and OFF when the relay terminal 18 detects an emergency mode. After being OK or OFF for a predetermined time, the relay terminal 18 turns OFF or ON. Instead of ON and OFF at a relay contact, ON and OFF signals may be output by a transistor or the like.

Figure 3:
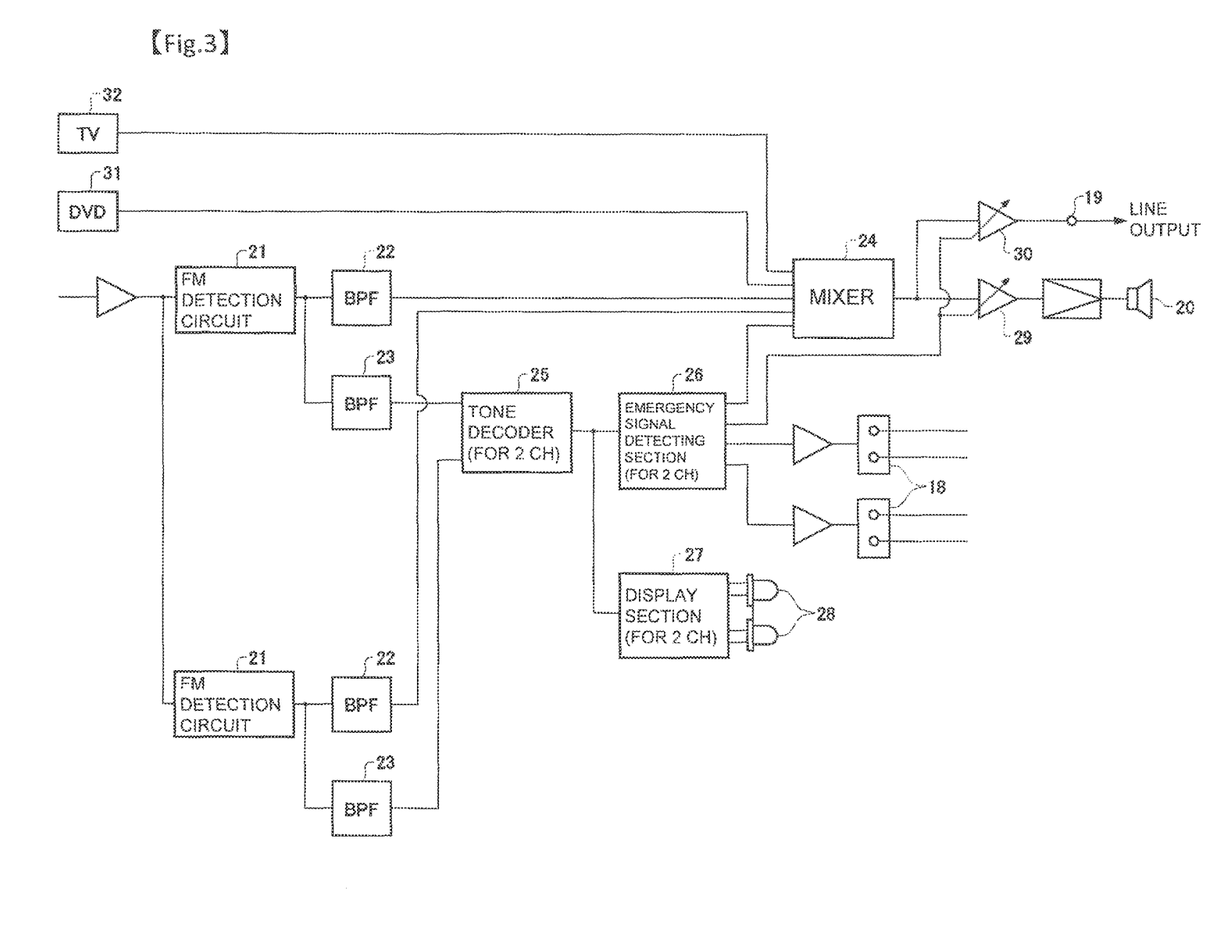
FIG. 3 is a diagram showing a detailed configuration of a sound processing section.

FIG. 3 is a diagram showing a specific configuration of the sound processing section 15. The sound processing section 15 comprises an FM detection circuit 21 that FM (frequency modulation)—detects a waveform acquired by the light reception sensor 14 and acquires an audio signal, a band-pass filter (BPF) 22 that extracts a sound signal (20 Hz to 20 kHz) from the acquired audio signal, and a band-pass filter (BPF) 23 that extracts a tone signal (32,768 kHz). The tone signal is a signal used for suppressing audible noise specific to an FM modulation system and sound output from jamming signals that occur when the microphone 11 is not powered or when a reception radio wave is weak. The tone signal is a signal transmitted on the audio signal. The tone signal is modulated by an encoded emergency signal, whereby the emergency signal is transmitted. As a frequency of the tone signal, it is also possible to use a frequency between 60 Hz and 80 Hz and a frequency between 15 kHz and 90 kHz besides the frequency explained above. If a frequency of 100 Hz to 20 kHz is used for the former case and that of 20 Hz to 14 kHz is used for the latter case as the sound signal, it is possible to prevent the tone signal from being mixed into the sound signal.

The sound processing section 15 comprises a mixer 24 that adds up the extracted sound signal and a sound signal from the DVD 31 or the TV 32. An output of the mixer 24 is connected to the speaker 20 via a variable amplifier 29 and connected to the line output terminal 19 via another variable amplifier 30.

The sound processing section 15 comprises a tone decoder 25 that decodes a tone signal extracted from an FM-demodulated signal by the band-pass filter 23. A signal (an emergency signal) decoded by the tone decoder 25 is input to an emergency signal detecting section 26 and a display section 27.

When the emergency signal detecting section 26 detects the emergency signal, the emergency signal detecting section 26 transmits the emergency signal to the management apparatus 40 from the relay output terminal 18 and inputs a signal indicating that the emergency signal is detected to the mixer 24 and the variable amplifiers 23 and 30. When the mixer 24 detects the emergency signal, the mixer 24 suppresses the volume of the DVD 31 or the TV 32. The variable amplifier 29 suppresses volume output from the speaker 20. The variable amplifier 30 amplifies a line-output sound signal. The speaker 20 may be built in the sound receiving apparatus 13 or may be installed in an appropriate location in the classroom as a separate speaker.

The display section 27 turns on an LED 28 on the basis of the input signal. In FIG. 3, only one tone decoder 25, one emergency signal detecting section 26, and one display section 27 are drawn. However, actually, the sound processing section 15 comprises tone decoders 25, emergency signal detecting sections 26, and display sections 27 equivalent to the number of at least one microphone (2 ch) that generate emergency signals.

Referring back to FIG. 1, the configuration of the management apparatus 40 is explained. The management apparatus 40 comprises a mixer 41, a speaker 42, and an emergency lamp 43. The mixer 41 has a function of processing a sound signal received from the sound receiving apparatus 13 and outputting sound from the speaker 42. The mixer 41 has a function of turning on the emergency lamp 43 upon receiving an emergency signal from the sound receiving apparatus 13. Emergency lamps 43, which are equal to the number of the classrooms CR, may be arranged to represent a positional relation of the classrooms CR. Upon receiving the emergency signal, the mixer 41 may turn on the emergency lamp 43 corresponding to the sound receiving apparatus 13 at a reception source. Accordingly, it is possible to easily locate a classroom CR in which an emergency occurs. The mixer 41 of the management apparatus 40 is connected to a speaker for public address system 44 provided in each of the classrooms CR.

The operation of the sound amplification apparatus 10 according to this embodiment is explained. First, the operation of the sound amplification apparatus 10 in a normal state is explained and then an operation performed when the emergency switch 12 operated is explained.

Figure 4:
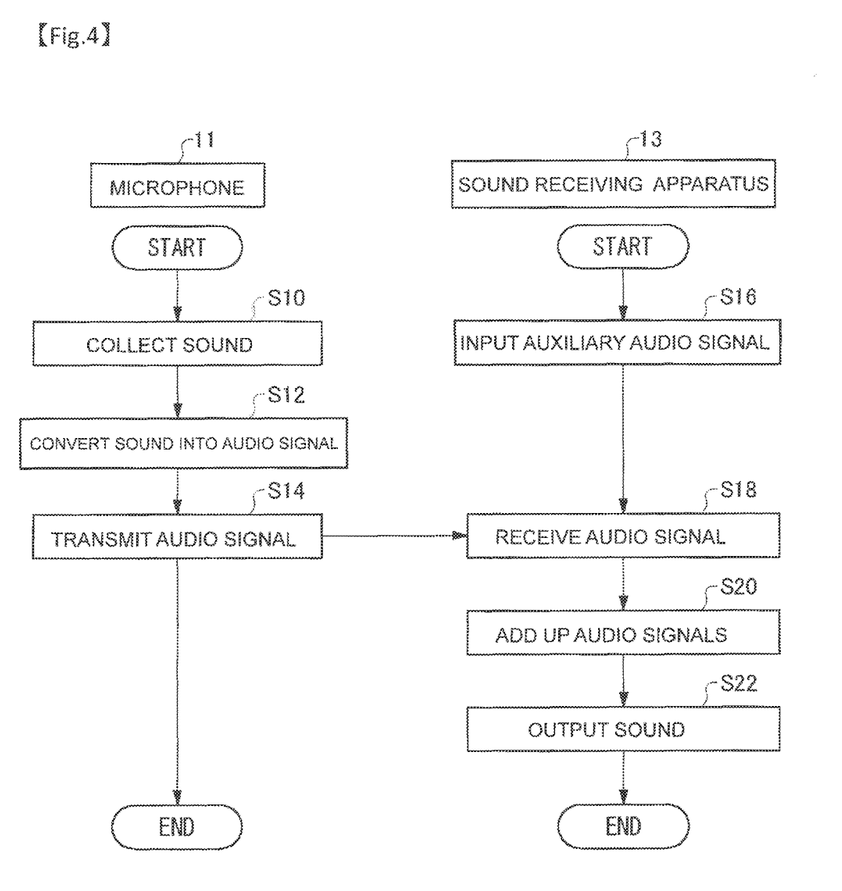
FIG. 4 is a flowchart for explaining the operation of a sound amplification apparatus in a normal state.

FIG. 4 is a flowchart for explaining the operation of the sound amplification apparatus 10 in the normal state. The microphone 11 collects sound (S10) and converts the sound into an audio signal (S12). The microphone 11 transmits the audio signal to the sound receiving apparatus 13 (S14).

The sound receiving apparatus 13 receives input of an auxiliary audio signal from the DVD 31 or the TV 32 (S16). The sound receiving apparatus 13 receives the audio signal transmitted from the microphone 11 (S18) and adds up the received audio signal and the auxiliary audio signal with the mixer 24 (S20). Subsequently, the sound receiving apparatus 13 outputs sound based on the added-up audio signal from the speaker 20 (S22). In FIG. 4, for convenience of explanation, the input of the auxiliary audio signal (S16) and the reception of the audio signal (S18) are described in this order. However, actually, audio signals are continuously input from the DVD 31 or the TV 32, which is an auxiliary sound source, and the sound receiving apparatus 13 continuously receives audio signals from the microphone 11.

Figure 5:
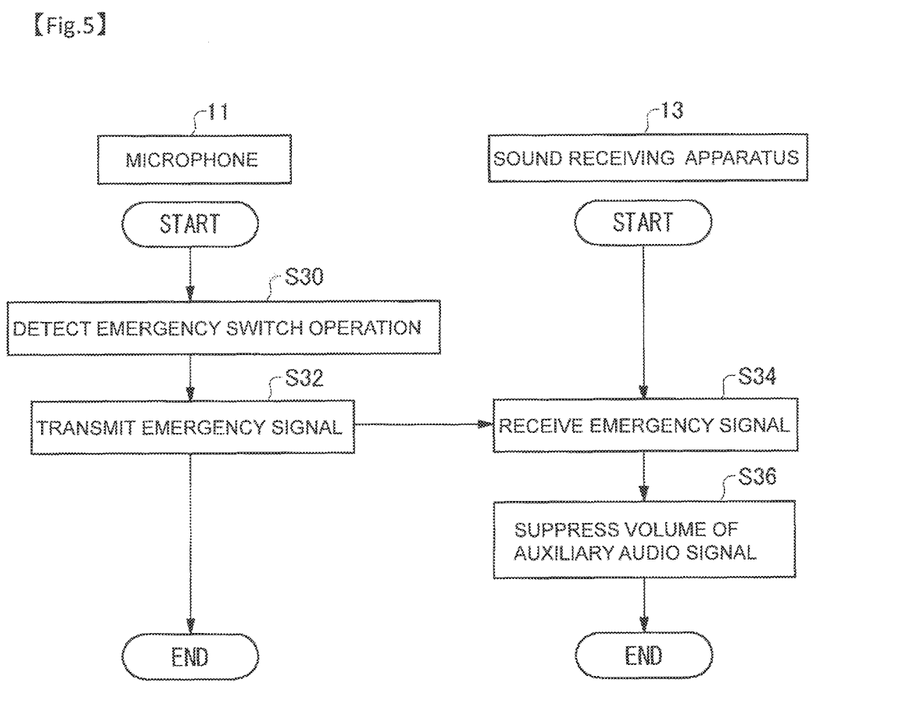
FIG. 5 is a flowchart for explaining the operation of the sound amplification apparatus performed when an emergency switch is operated.

FIG. 5 is a flowchart for explaining the operation of the sound amplification apparatus 10 performed when the emergency switch 12 is operated. When detecting that the emergency switch 12 is operated in the microphone 11 during the normal operation shown in FIG. 4 (S30), the microphone 11 transmits an emergency signal to the sound receiving apparatus 13 (S32). Upon receiving the emergency signal (S34), the sound receiving apparatus 13 suppresses the volume of the auxiliary audio signal from the DVD 31 or the TV 32 (S36).

Consequently, other sound in the classroom CR is not blocked by the sound of the DVD 31 or the TV 32. Therefore, utterance content of an intruder and utterance content of a teacher can be easily heard. In step S36, the volume of the auxiliary audio signal may be reduced to zero or may be simply reduced. If the volume of the auxiliary audio signal is reduced to zero just at the moment when an intruder intrudes, it is likely that the intruder becomes aware that some emergency processing is performed. Therefore, sound of another sound source may be continuously output at volume smaller than usual.

Once the emergency switch 12 is turned on, the emergency signal to the sound receiving apparatus 13 is continuously transmitted. However, the emergency mode on the microphone 11 side is released and changes to the normal mode according to power on and off of the microphone 11. The transmission of the emergency signal is stopped. When once receiving the emergency signal, the sound receiving apparatus 13 maintains the emergency mode. However, upon receiving a sound signal without the emergency signal from the microphone 11 that returns to the normal mode or the microphone 11 operating in the other normal mode, the sound receiving apparatus 13 returns to a state previous to the emergency mode. Consequently, volume settings of the sound receiving apparatus 13 return to setting immediately before the sound receiving apparatus 13 changes to the emergency mode.

Figure 6:
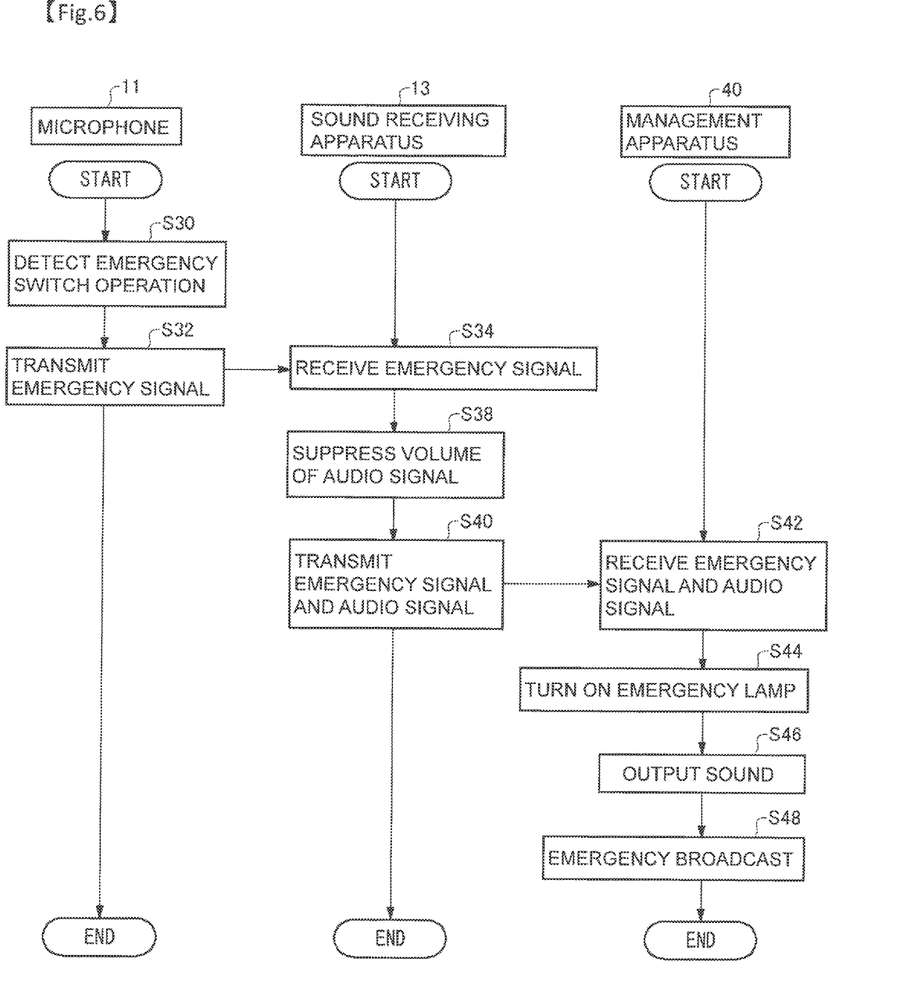
FIG. 6 is a flowchart for explaining the operation of the sound amplification apparatus performed when the emergency switch is operated.

FIG. 6 is a flowchart for explaining another operation of the sound amplification apparatus 10 performed when the emergency switch 12 is operated. When detecting that the emergency switch 12 is operated in the microphone 11 (S30), the microphone 11 transmits an emergency signal to the sound receiving apparatus 13 (S32). Upon receiving the emergency signal (S34), the sound receiving apparatus 13 suppresses the volume of an audio signal from the microphone 11 (S38) and transmits the emergency signal and the audio signal to the management apparatus 40 located in a remote location (S40). The sound receiving apparatus 13 may control the volume of audio signals from the plural microphones 11 in association with the microphone 11 at a transmission source of the emergency signal.

Upon receiving the emergency signal (S42), the management apparatus 40 turns on the emergency lamp 43 (S44)

and outputs the received audio signal from the speaker 42 (S46). The management apparatus 40 informs, through emergency broadcast from the speaker for public address system 44, that an emergency has occurred (S48). The management apparatus 40 may use the received audio signal for this emergency broadcast. The management apparatus 40 does not perform the emergency broadcast for the classroom CR where the sound receiving apparatus 13 at a transmission source of the emergency signal is provided and the classrooms CR around the classroom CR. The emergency broadcast is not heard in a space where the microphone 11 is located and a space where the sound receiving apparatus 13 is provided. Even if the emergency broadcast is transmitted to these spaces as a sound wave, volume in these spaces only has to be smaller than the volume of the emergency broadcast for the classrooms around the spaces and have low audibility enough for making it impossible to understand contents of the broadcast. Accordingly, it is possible to prevent the emergency broadcast from uselessly exciting the intruder.

With the operation shown in FIG. 6, since the volume output from the speaker 20 decreases, it is possible to effectively prevent echo and howling that occur because the microphone 11 picks up the sound from the: speaker 20. Therefore, it is possible to transmit high-quality sound to the management apparatus 40.

In the above explanation, the operations of the sound amplification apparatus 10 are explained separately with reference to FIGS. 5 and 6. However, the sound amplification apparatus 10 may perform both the operation shown in FIG. 5 and the operation shown in FIG. 6.

(Second Embodiment)

Figure 7:
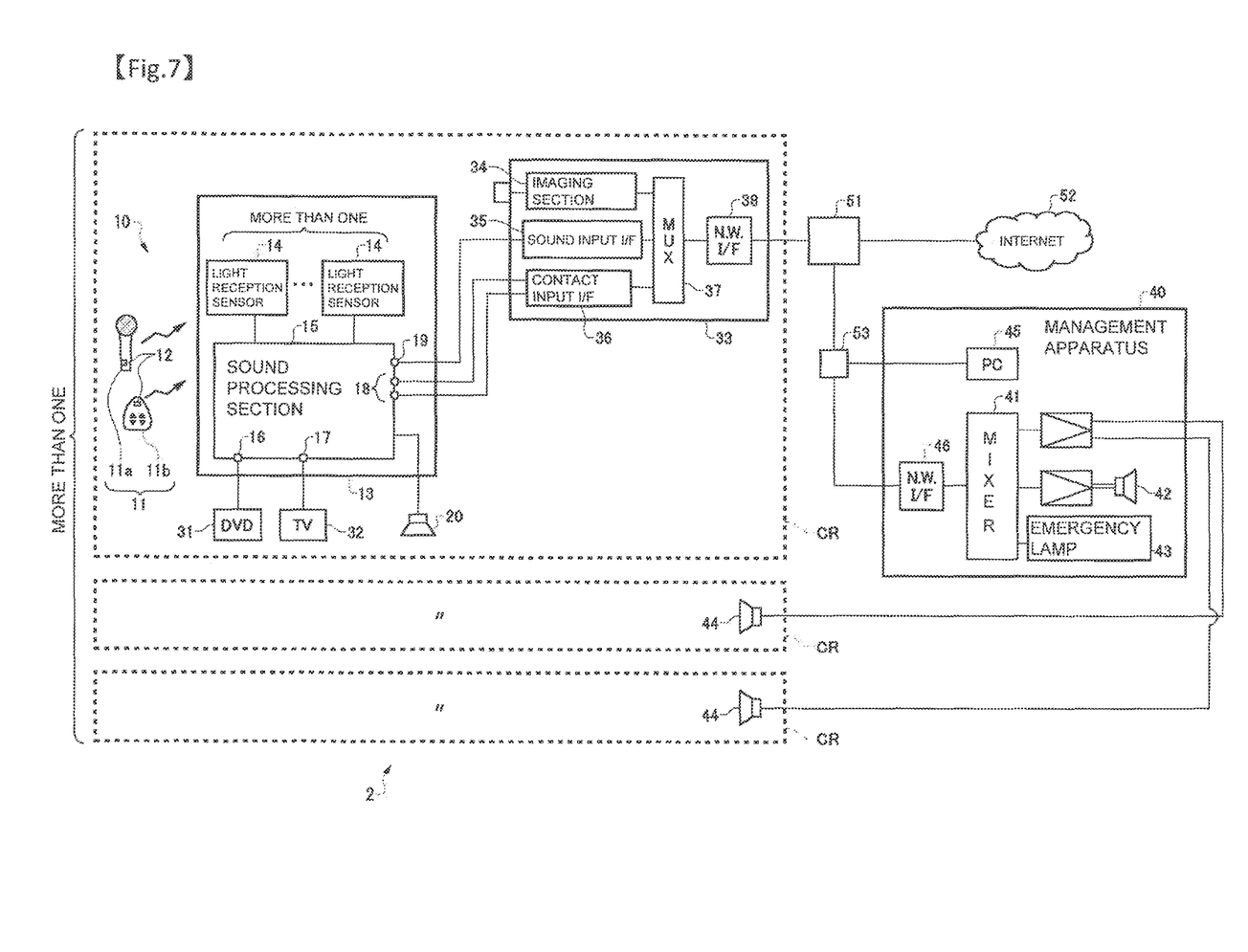
FIG. 7 is a diagram showing the configuration of a sound receiving system according to a second embodiment.

FIG. 7 is a diagram showing the configurations of a sound receiving system 2 and the sound amplification apparatus 10 according to a second embodiment. Basic configurations of the sound receiving system 2 and the sound amplification apparatus 10 according to the second embodiment are the same as those in the first embodiment. However, the second embodiment is different from the first embodiment in that a camera 33 is connected to the sound amplification apparatus 10. In the second embodiment, instead of directly connecting the sound receiving apparatus 13 and the management apparatus 40, the management apparatus 40 is connected to the sound receiving apparatus 13 through a network from the camera 33. The configuration of the camera 33 is explained below.

The camera 33 comprises an image pickup section 34 with a zoom function that picks up an image of at state in the classroom CR, a sound input interface 35 connected to the line output terminal 19 of the sound processing section 15, and a contact input interface 36 connected to the relay output terminal 18 of the sound processing section 15. The camera 33 comprises a multiplexer (MUX) 37. The multiplexer 37 superimposes an image picked up by the image pickup section 34, a sound signal input from the sound input interface 35, and an emergency signal input from the contact input interface 36. The camera 33 comprises a network interface 38 that transmits a signal superimposed by the multiplexer 37 to the network.

The network interface 38 of the camera 33 is connected to the Internet 52 via a gateway 51. Therefore, the camera 33 can transmit the superimposed signal to, for example, a security company and a municipal office by designating an appropriate address as a destination. The network interface 38 is connected to the management apparatus 40 as well via the gateway 51. The signal from the camera 33 is input to a PC 45 of the management apparatus 40 via a hub 53 and input to the mixer 41 via the hub 53 and a network interface 46. The PC 45 may be provided independently from the management apparatus 40.

The operations of the sound amplification apparatus 10 according to the second embodiment are explained below. The operation of the sound amplification apparatus 10 according to the second embodiment in the normal state is the same as that in the first embodiment (see FIG. 4). In the second embodiment, as in the first embodiment, the sound amplification apparatus 10 performs an operation for suppressing the volume of an auxiliary audio signal (see FIG. 5) and an operation for suppressing an audio signal from the microphone 11 (see FIG. 6). In the second embodiment, unlike the first embodiment, the sound amplification apparatus 10 transmits an audio signal and an emergency signal to the network via the camera 33. Therefore, this operation will be explained.

Figure 8:
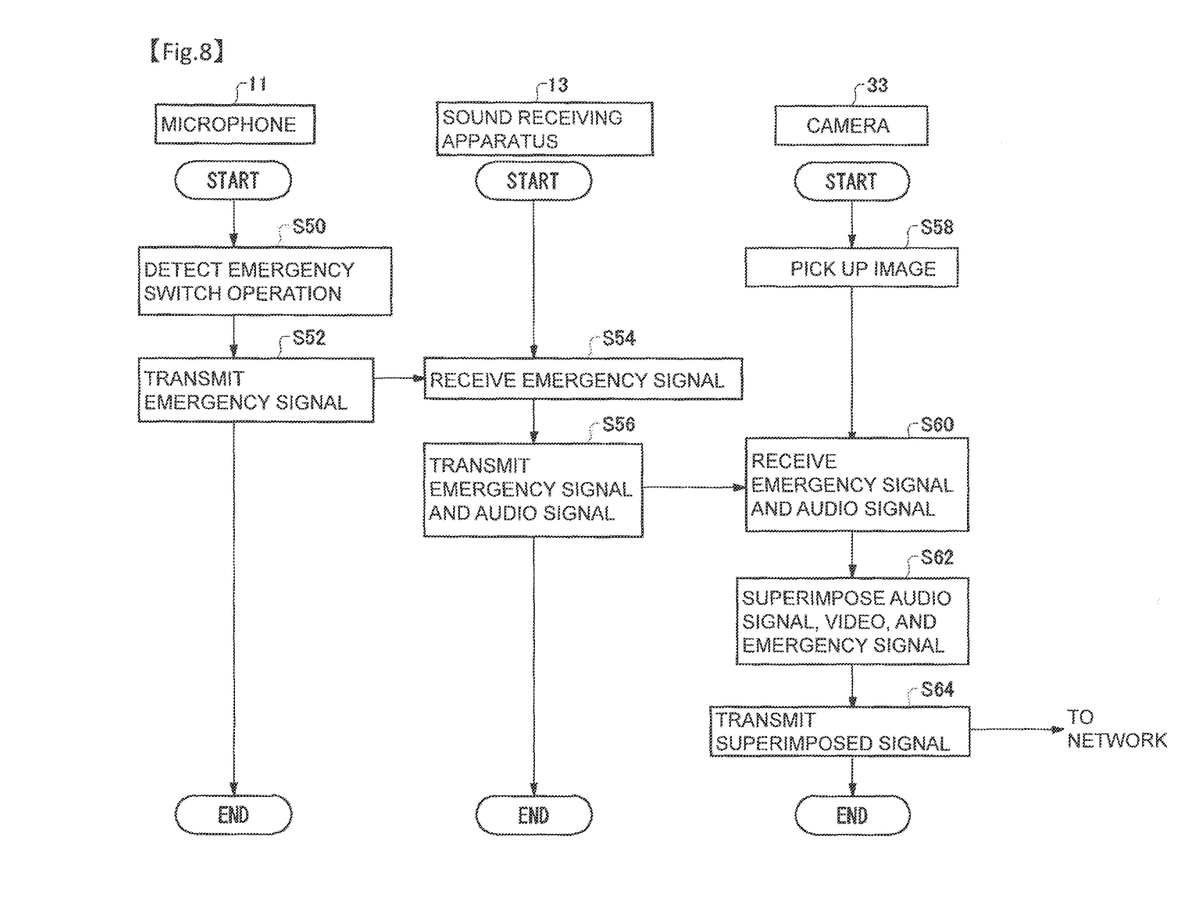
FIG. 8 is a flowchart for explaining the operation of the sound amplification apparatus performed when the emergency switch is operated.

FIG. 8 is a flowchart for explaining the operation of the sound amplification apparatus 10 according to the second embodiment. When detecting that the emergency switch 12 is operated (S50), the microphone 11 transmits an emergency signal to the sound receiving apparatus 13 (S52). Upon receiving the emergency signal (S54), the sound receiving apparatus 13 transmits the emergency signal and an audio signal to the camera 33 (S56).

The camera 33 always picks up an image of a state in the classroom CR (S58). Upon receiving the emergency signal and the audio signal transmitted from the sound receiving apparatus 13 (S60), the camera 33 superimposes the emergency signal and the audio signal and at video picked up by the camera 33 (S62) and transmits a superimposed signal obtained by the superimposition to the network (S64). The management apparatus 40 receives the superimposed signal. The mixer 41 reproduces the emergency signal and the audio signal. The PC 45 reproduces the video. The PC 45 may reproduce, in addition to the video, at least one of the emergency signal and the audio signal. The transmission and reception of the superimposed signal can be performed by an electronic mail text, attachment, or streaming but is not limited to these.

According to this embodiment, it is possible to provide more detailed information to the outside by transmitting and receiving a video in addition to sound in the classroom CR. The video may be a moving image or at least one or more still images. Since the information is transmitted through the network, it is possible to transmit the information not only to the management apparatus 40 but also to an appropriate destination. Upon receiving the emergency signal, the camera 33 may be able to pick up images of every corner of the classroom by zooming out to an angle larger than a zoom angle at that point.

(Other Embodiments)

Other embodiments of the present invention are explained below.

A sound receiving apparatus according to an embodiment is a sound receiving apparatus that receives an audio signal transmitted from one or more microphones, which convert collected sound into an audio signal and transmit the audio signal by radio, and amplifies and outputs sound based on the audio signal. The sound receiving apparatus is configured to perform sound output control in an emergency mode upon receiving an emergency signal transmitted in response to operation of an emergency switch of the microphone.

With this configuration, since the sound receiving apparatus receives the emergency signal transmitted according to the operation of the emergency switch included in the microphone, which somebody often has at hand, it is possible to switch the sound receiving apparatus to the sound output control in the emergency mode without being noticed by an intruder.

A sound receiving apparatus according to an embodiment comprises a receiving section that receives an audio signal and an emergency signal from the microphone, an input section to which an auxiliary audio signal is input from a sound source different from the microphone, a volume adjusting section that adjusts the volume of the audio signal from the microphone and the auxiliary audio signal, and an output section that outputs sound based on the audio signal and the auxiliary audio signal. The volume adjusting section is configured to suppress the volume of the auxiliary audio signal in the emergency mode.

With this configuration, since the volume of the unnecessary auxiliary sound source is suppressed in an emergency, other sounds can be easily heard. It is possible to notify, without being hindered by the auxiliary sound source such as another acoustic apparatus, a dangerous situation recognized by sound collected by the microphone.

A sound receiving apparatus according to an embodiment comprises a receiving section that receives an audio signal and an emergency signal from the microphone, a volume adjusting section that adjusts the volume of the audio signal received from the microphone, an output section that outputs sound based on the audio signal, and a signal output section that outputs the audio signal for a remote location. The volume adjusting section is configured to suppress, in the emergency mode, the volume of an audio signal output to a speaker.

With this configuration, since sound amplification in the microphone is suppressed, the microphone does not collect again sound output from the speaker. Echo due to sound reflection in a room and howling in the case of approach to the speaker of the microphone less easily occur. Therefore, it is possible to output an audio signal having high audibility to a remote location.

In the sound receiving apparatus according to the embodiment, the volume adjusting section is configured to increase, in the emergency mode, the volume of the audio signal output to the signal output section.

With this configuration, it is possible to appropriately output the audio signal to a remote location.

In the sound receiving apparatus according to the embodiment, the sound adjusting section is configured to increases or decreases, in the emergency mode, the volume of an audio signal from the microphone that receives the emergency signal among the plural microphones and the volume of audio signals from the other microphones, both in the same direction.

With this configuration, it is possible to control, in the emergency mode, the volume of the other microphones in association with the microphone that transmits the emergency signal.

In the sound receiving apparatus according to the embodiment, the volume adjusting section is configured to increases or decreases, in the emergency mode, the volume of an audio signal from the microphone that receives the emergency signal among the plural microphones and the volume of audio signals from the other microphones in opposite direction.

With this configuration, it is possible to control, in the emergency mode, the volume of the other microphones in association with the microphone that transmits the emergency signal.

A sound receiving apparatus according to an embodiment has an electric contact for outputting the emergency signal to the outside in response to reception of the emergency signal.

With this configuration, it is possible to control an external electronic apparatus according to the emergency signal.

A sound receiving apparatus according to an embodiment is configured to transmit the emergency signal to a network in response to reception of the emergency signal.

With this configuration, it is possible to notify an apparatus connected to the network of the emergency signal.

A sound processing method according to an embodiment is a sound processing method by a sound receiving apparatus that receives, by radio, an audio signal transmitted from a microphone, receives an auxiliary audio signal from a sound source different from the microphone, amplifies sound based on the audio signal and the auxiliary audio signal, and outputs the sound from a speaker. The sound processing method comprises a step of the sound receiving apparatus receiving an emergency signal from the microphone, a step of the sound receiving apparatus adjusting the volume of the audio signal from the microphone and the auxiliary audio signal, the sound receiving apparatus suppressing the volume of the auxiliary audio signal upon receiving the emergency signal, and a step of the sound receiving apparatus outputting the sound based on the audio signal and the auxiliary audio signal from the speaker.

With this configuration, since the volume of the unnecessary auxiliary sound source is suppressed in an emergency, other sounds can be easily heard. It is possible to notify, without being hindered by the auxiliary sound source such as another acoustic apparatus, a dangerous situation recognized by sound collected by the microphone.

A sound processing method according to an embodiment is a sound processing method by a sound receiving apparatus that receives, by radio, an audio signal transmitted from a microphone, amplifies sound based on the audio signal, and outputs the sound from a speaker. The sound processing method comprises a step of the sound receiving apparatus receiving an emergency signal from the microphone, a step of the sound receiving apparatus suppressing the volume of an audio signal output from the speaker upon receiving the emergency signal, and a step of the sound receiving apparatus outputting the audio signal for a remote location upon receiving the emergency signal.

With this configuration, since sound amplification in the microphone is suppressed, the microphone does not collect again sound output from the speaker. Echo due to sound reflection in a room and howling in the case of approach to the speaker of the microphone less easily occur. Therefore, it is possible to output an audio signal having high audibility to a remote location.

A program according to an embodiment is a program for receiving, by radio, an audio signal transmitted from a microphone, receiving an auxiliary audio signal from a sound source different from the microphone, amplifying sound based on the audio signal and the auxiliary audio signal, and outputting the sound from a speaker. The program has a configuration for causing a computer included in a sound receiving apparatus to execute a step of receiving an emergency signal from the microphone, a step of adjusting the volume of the audio signal from the microphone and the auxiliary audio signal, the step of suppressing the volume of the auxiliary audio signal when the sound receiving apparatus receives the emergency signal, and a step of outputting the sound based on the audio signal and the auxiliary audio signal from the speaker.

With this configuration, since the volume of the unnecessary auxiliary sound source is suppressed in an emergency, other sounds can be easily heard. It is possible to notify, without being hindered by the auxiliary sound source such as another acoustic apparatus, a dangerous situation recognized by sound collected by the microphone.

A program according to another embodiment is a program for receiving, by radio, an audio signal transmitted from a microphone, amplifying sound based on the audio signal, and outputting the sound from a speaker. The program has a configuration for causing a computer included in a sound receiving apparatus to execute a step of receiving an emergency signal from the microphone, a step of suppressing, when the sound receiving apparatus receives the emergency signal, the volume of an audio signal output from the speaker, and a step of outputting the audio signal for a remote location when the sound receiving apparatus receives the emergency signal.

With this configuration, since sound amplification in the microphone is suppressed, the microphone does not collect again sound output from the speaker. Echo due to sound reflection in a room and howling in the case of approach to the speaker of the microphone less easily occur. Therefore, it is possible to output an audio signal having high audibility to a remote location.

A sound receiving system according to an embodiment comprises the microphone and the sound receiving apparatus. The sound receiving apparatus is configured to receive the audio signal and an emergency signal corresponding to operation of an emergency switch of the microphone from the microphone.

With this configuration, it is possible to output the audio signal from the microphone to a remote location in response to reception of the emergency signal. Therefore, it is possible to grasp, in the remote location, a state in an emergency.

In the sound receiving system according to the embodiment, the sound receiving system has a configuration for outputting sound at inaudible volume in a space where the sound receiving apparatus is provided.

With this configuration, it is possible to prevent an intruder from noticing that the audio signal is transmitted to an apparatus present in a location different from the space where the sound receiving apparatus is provided.

A sound receiving system according to an embodiment comprises the microphone, the sound receiving apparatus, and a camera that picks up an image of a space including the microphone. The sound receiving apparatus inputs the audio signal and an emergency signal to the camera in the emergency mode. The camera is configured to transmit the audio signal, the emergency signal, and an image picked up by the camera to a network.

With this configuration, it is possible to transmit the image picked up by the camera together with the audio signal from the microphone.

The sound receiving system and the sound receiving apparatus according to the present invention are explained in detail above with reference to the embodiments. However, the present invention is not limited to the embodiments.

In the embodiments, the first embodiment in which the relay output terminal 18, the line output terminal 19, and the management apparatus 40 are directly connected and the second embodiment in which the relay output terminal 18, the line output terminal 19, and the management apparatus 40 are connected to the network via the camera 33 are explained as separate embodiments. However, it is also possible to combine the two embodiments. For example, in the second embodiment, the camera 33 may receive an emergency signal from the sound receiving apparatus 13, superimpose the emergency signal and a picked-up video, and transmit a superimposed signal to the network. When a built-in microphone or an external microphone is provided in the camera 33, the camera 33 may superimpose an audio signal obtained by the built-in microphone or the external microphone and the emergency signal, and transmit a superimposed signal to the network. Further, as explained above, the camera 33 may superimpose the emergency signal and a video signal and transmit a superimposed signal to the network and transmit an output signal of the sound receiving apparatus 13 to the network as an audio signal.

In the embodiments, the example in which the variable amplifier 29 suppresses volume output from the speaker 20 in the emergency mode is explained. However, the sound receiving apparatus 13 or the microphone 11 may increase the volume of the microphone 11 (the volume, of a sound input of the built-in microphone or the external microphone) in response to operation of the emergency switch 12. Accordingly, sound of the microphone 11 can be easily heard in the space where the microphone 11 is located.

In the embodiments, the example in which the configuration of the sound processing section 15 is configured by the circuit is explained. However, the sound processing section 15 can be configured by software as well. A program for causing a computer (a control section) included in the sound receiving apparatus 13 to execute the steps of the operations shown in FIGS. 4 to 6 or FIG. 8 is also included in the scope of the present invention.

The preferred embodiments of the present invention conceivable at present are explained above. However, various modifications are possible for the embodiments. It is intended that the appended claims include all such modifications that are within the true spirit and the scope of the present invention.

INDUSTRIAL APPLICABILITY

As explained above, according to the present invention, since the sound receiving apparatus receives an emergency signal transmitted in response to operation of the emergency switch included in the microphone, which somebody often has at hand, there is an excellent effect that it is possible to switch the sound receiving apparatus to the sound output control in the emergency mode without being noticed by an intruder. The sound receiving apparatus is useful as a sound amplification apparatus or the like used inside a building such as a classroom of a school, a church, a meeting room, or a hall.

REFERENCE SIGNS LIST

1, 2 sound receiving systems
10 sound amplification apparatus
11 microphone
12 emergency switch
13 sound receiving apparatus
14 light reception sensor
15 sound processing section
16 DVD input terminal
17 TV input terminal
18 relay output terminal
19 line output terminal
20 speaker
21 FM detection circuit
22, 23 band-pass filters 24 mixer
25 tone decoder
26 emergency signal detecting section
27 display section
28 LED
29, 30 variable amplifiers
31 DVD
32 TV
33 camera
34 image pickup section
35 sound input interface
36 contact input interface
37 multiplexer
38 network interface
40 management apparatus
41 mixer
42 speaker
43 emergency lamp
44 speaker for public address system
45 PC
46 network interface
51 gateway
52 Internet
53 hub
61 built-in microphone
62 external apparatus audio signal input section
63 external microphone sound input section
64 sound input switching section
65 tone encoder
66 tone signal generating section
67 mixing section
68 FM modulation section
69 amplifier

The invention claimed is:

1. A method for outputting an alert, comprising:
   receiving an audio signal transmitted from a first microphone located in a first room;
   outputting sound based on the audio signal by a first speaker located in the first room;
   receiving an emergency signal transmitted from the first microphone located in the first room in response to a user operating an emergency switch of the first microphone;
   non-outputting an audio alert by the first speaker located in the first room in response to receiving the emergency signal; and
   outputting an audio alert by a second speaker located in a second room distinct from the first room in response to receiving the emergency signal.

2. The method for outputting an alert of claim 1, further comprising:
   receiving an emergency signal transmitted from a second microphone located in the second room in response to a user operating an emergency switch of the second microphone; and
   non-outputting an audio alert by the second speaker located in the second room in response to receiving the emergency signal from the second microphone.

3. The method for outputting an alert of claim 2, further comprising:
   outputting the audio alert by the first speaker located in the first room in response to receiving the emergency signal from the second microphone.

4. The method for outputting an alert of claim 2, further comprising:
   outputting the audio alert by a third speaker located in a third room distinct from the first room and the second room in response to receiving the emergency signal from the second microphone.

5. The method for outputting an alert of claim 1, further comprising:
   non-outputting the audio alert by a third speaker located in a third room of which location is closer to the first room than the second room in response to receiving the emergency signal.

6. The method for outputting an alert of claim 1, further comprising:
   outputting sound based on the audio signal by a speaker located in a management room in response to receiving the emergency signal.

7. The method for outputting an alert of claim 1, further comprising:
   suppressing volume of the sound, based on the audio signal, output by the first speaker in response to receiving the emergency signal.

8. The method for outputting an alert of claim 1, further comprising:
   receiving an external audio signal input from an external audio apparatus;
   outputting sound based on the external audio signal by the first speaker; and
   suppressing volume of the sound, based on the external audio signal, output by the first speaker in response to receiving the emergency signal.

9. The method for outputting an alert of claim 1, further comprising:
   stopping outputting the audio alert by the second speaker in response to detecting that an emergency situation is ended.

10. The method for outputting an alert of claim 1, further comprising:
    continuously receiving the emergency signal transmitted from the first microphone; and
    stopping outputting the audio alert by the second speaker in response to detecting that transmissions attic emergency signals are stopped.

11. A method fair outputting an alert, comprising:
    receiving, via a first network, a first emergency signal transmitted from an emergency transmitter located in a first room;
    transmitting, via a second network, a second emergency signal to a receiver located in a management room;
    outputting an audio alert by a second speaker located in a second room in response to the receiver receiving the second emergency signal; and
    non-outputting the audio alert by a first speaker located in the first room in response to the receiver receiving the second emergency signal.

12. The method for outputting an alert of claim 11, further comprising:
    receiving, via the first network, the first emergency signal transmitted from an emergency transmitter located in the second room;
    transmitting, via the second network, the second emergency signal to the receiver located in the management room; and
    non-outputting the audio alert by the second speaker located in the second room in response to the receiver receiving the second emergency signal from the emergency transmitter located in the second room.

13. The method for outputting an alert of claim 12, further comprising:
    outputting the audio alert by the first speaker located in the first room in response to the receiver receiving the second emergency signal from the emergency transmitter located in the second room.

14. The method for outputting an alert of claim 12, further comprising:
outputting the audio alert by a third speaker located in a third room in response to the receiver receiving the second emergency signal from the emergency transmitter located in the second room.

15. The method for outputting an alert of claim 11, wherein the emergency transmitter comprises a microphone that collects sound, converts the collected sound into an audio signal and transmits the audio signal together with the first emergency signal to a sound receiver via the first network, the method further comprising:
suppressing volume of the sound output by the first speaker in response to the sound receiver receiving the first emergency signal.

16. A system for outputting an alert, comprising:
a first receiver that receives an audio signal and an emergency signal from a first sound transmitting apparatus located in a first room;
a management apparatus that connects to a first speaker located in the first room and a second speaker located in a second room distinct from the first room; and
a first emergency outputter that notifies an emergency to the management apparatus when the first receiver receives the emergency signal, wherein:
the management apparatus outputs an audio alert by the second speaker located in the second room when the first emergency outputter notifies the emergency to the management apparatus, and does not output the audio alert by the first speaker located in the first room when the emergency outputter notifies the emergency to the management apparatus.

17. The system for outputting an alert of claim 16, further comprising:
a second receiver that receives an audio signal and an emergency signal from a second sound transmitting apparatus located in the second room; and
a second emergency outputter that notifies an emergency to the management apparatus when the second receiver receives the emergency signal, wherein;
the management apparatus does not output the audio alert by the second speaker located in the second room when the second emergency outputter notifies the emergency to the management apparatus.

18. The system for outputting an alert of claim 17, wherein:
the management apparatus outputs the audio alert by the first speaker located in the first room when the second emergency outputter notifies the emergency to the management apparatus.

19. The system for outputting an alert of claim 17, wherein:
the management apparatus outputs the audio alert by the third speaker located in a third room distinct from the first room and the second room when the second emergency outputter notifies the emergency to the management apparatus.

* * * * *